(12) United States Patent
Scott (10) Patent No.: US 6,209,185 B1
(45) Date of Patent: Apr. 3, 2001

(54) EARTH-BORING BIT WITH IMPROVED RIGID FACE SEAL

(75) Inventor: Danny E. Scott, Montgomery, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/332,799

(22) Filed: Jun. 14, 1999

Related U.S. Application Data (63) Continuation-in-part of application No. 08/923,009, filed on Sep. 3, 1997, now Pat. No. 6,068,070, and a continuation-in-part of application No. 08/839,418, filed on Apr. 14, 1997, now Pat. No. 6,045,029, which is a continuation of application No. 08/620,639, filed on Mar. 22, 1996, now abandoned, which is a continuation-in-part of application No. 08/390,897, filed on Feb. 15, 1995, now abandoned, which is a continuation of application No. 08/048,863, filed on Apr. 16, 1993, now abandoned.

(51) Int. Cl.$^7$ .................................................. B23P 25/00
(52) U.S. Cl. .................. 29/458; 277/404; 427/248.1; 29/434; 29/527.3
(58) Field of Search .................. 29/458, 424, 527.1, 29/434; 277/404, 380, 382; 156/60, 330; 427/528, 596, 525, 530, 562, 577, 582, 561, 249, 250, 248.1; 228/122.1, 177

(56) References Cited

U.S. PATENT DOCUMENTS

| | | |
|---|---|---|
| 3,529,840 | * 9/1970 | Durham et al. . |
| 3,761,145 | * 9/1973 | Schmacher, Jr. .................. 308/8.2 |

(List continued on next page.)

FOREIGN PATENT DOCUMENTS

| | | |
|---|---|---|
| 2168737A | 6/1986 | (GB) . |
| 1261570 | 10/1989 | (JP) . |
| 2192483 | 7/1990 | (JP) . |

OTHER PUBLICATIONS

U.S. application No. 08/923,300, Scott, filed Aep. 3, 1997.
Mechanical property Measurements of bulk polycrystallin CVD diamond; Valentine et al; Diamond and Related Materials, 3(194) 1158–1172.
Properties of bulk polycrystalline CVD diamond; Sussman et al.; Diamond and Related Materials, 3(1994) 303–312.
Preliminary measurements and assessment of strength and fracture toughness in free standing CVD diamond for high speed missile domes; Trombetta et al; SPI Proceedings, vol. 1760, 1992.

(List continued on next page.)

Primary Examiner—S. Thomas Hughes
Assistant Examiner—John C. Hong
(74) Attorney, Agent, or Firm—Bracewell & Patterson, LLP; James E. Bradley (57) ABSTRACT

A method of constructing an earth-boring bit provides a face seal assembly with a diamond layer having a face with recesses for enhanced lubrication. The earth-boring bit has a bit body, at least one cantilevered bearing shaft, including a base and a cylindrical journal bearing surface extending inwardly and downwardly from the bit body, and at least one cutter mounted for rotation on the cylindrical journal bearing surface of the bearing shaft. The seal assembly is disposed between the cylindrical journal bearing surface and the cutter proximally to the base of the cantilevered bearing shaft. The seal assembly includes at least one rigid seal ring having a seal face in contact with a second seal face. At least one of the seal faces is at least partially formed of a super-hard material having wear-resistance greater than, and a coefficient of sliding friction less than, that of the rigid seal ring material. The super-hard layer is deposited on a substrate that has a face finished with a shape that is the inverse of the desired contour on the seal face. The super-hard layer is then separated from the substrate, resulting in a face with the desired contour. The diamond layer is then attached to the rigid seal ring.

12 Claims, 4 Drawing Sheets

U.S. PATENT DOCUMENTS

| | | | |
|---|---|---|---|
| 4,176,848 | * 12/1979 | Lafuze | 277/92 |
| 4,190,301 | 2/1980 | Lachonius et al. . | |
| 4,260,203 | 4/1981 | Garner . | |
| 4,344,629 | * 8/1982 | Oleka | 277/1 |
| 4,372,624 | * 2/1983 | Nelson | 384/94 |
| 4,516,641 | * 5/1985 | Burr | 175/228 |
| 4,729,440 | 3/1988 | Hall . | |
| 4,738,322 | 4/1988 | Hall et al. . | |
| 4,756,631 | 7/1988 | Jones . | |
| 4,776,598 | 10/1988 | Akema . | |
| 4,789,251 | 12/1988 | McPherson et al. . | |
| 4,822,057 | 4/1989 | Chia et al. . | |
| 4,960,643 | 10/1990 | Lemelson . | |
| 4,987,007 | 1/1991 | Wagal et al. . | |
| 5,067,826 | 11/1991 | Lamelson . | |
| 5,098,737 | 3/1992 | Collins et al. . | |
| 5,108,813 | 4/1992 | Noda et al. . | |
| 5,183,529 | 2/1993 | Potter et al. . | |
| 5,264,071 | 11/1993 | Anthony et al. . | |
| 5,271,547 | 12/1993 | Carlson . | |
| 5,273,731 | 12/1993 | Anthony et al. . | |
| 5,314,652 | 5/1994 | Simpson et al. . | |
| 5,337,844 | 8/1994 | Tibbitts . | |
| 5,349,922 | 9/1994 | Anthony et al. . | |
| 5,500,248 | 3/1996 | Iacovangelo et al. . | |
| 5,523,158 | 6/1996 | Kapoor et al. . | |
| 5,523,159 | 6/1996 | Kapoor et al. . | |
| 5,547,121 | 8/1996 | Kapoor et al. . | |
| 5,567,525 | 10/1996 | Kapoor et al. . | |

OTHER PUBLICATIONS

Relation of friction and wear to processing parameters of polycrystalline diamond films grown on silicon and silica by the hot filament method; Lai et al; Materials Science and Engineering A183(1994) 257–265.

The effect of roughness on the friction and wear of diamond thin films; Bull et al; Surface and Coating Technology 68–69 (1994) 603–610.

New Unit for Brazing Single–Crystal Diamond; G. Paffenhoff GmbH & Co.

A New Class of CVD Diamond Composite Materials for Cost–Sensitive, Large–Area Application; Pinneo; Elsevier Science Publishers B.V., 1991.

Electronic and optical products; Diamonex Diamond Coatings brochure

Diamonex Incorporated brochure; 1992.

Norton Introduces "White" CVD Diamond Wafers; Norton Company; Feb. 11, 1992.

Norton Diamond Film; Leading a New Technology into Commercial Applications; Norton Company.

Pure Diamond Available in Large Sizes; Norton Company.

Cutting Tools; Norton Diamond Film; Apr. 1993.

Features and benefits; CVD Diamond.

Applications of CVD Diamond in Thermal Management; Yoshikawa et al; $2_{nd}$ International Conference on the Applications of Diamond Films and Related Materials; 1993.

Mass Flow in Laser–Plasma Deposition of carbon Under Oblique Angels of Incidence; Davanloo et al; Appl. Phys.A 54, 369–372 (1992).

Adhesion and mechanical properties of amorphic diamond films prepared by a laser plasma discharge source; Davanloo et al;J. Appl. Phys. 71(3), Feb. 1, 1992.

Modelling of a laser plasma source of amorphic diamond; Stevefelt et al; J. Appl. Phys. 24 (1991) 2149–2153.

Microstructure of amorphic diamond; Collins et al; J. Appl. Phys. 69 (11) Jun. 1, 1991.

Laser plasma diamond; Davanloo et al; J. Mater. Res., vol.5, No.11, Nov. 1990.

Diamond–like carbon films prepared with a laser ion source; Wagal et al; Appl. Phys. Lett. 53(3), Jul. 18, 1988.

Friction of diamond on diamond and chemical vapour deposition diamond coatings; Feng et al; Surface and Coatings Technology, 47(1991) 631–645.

The formation of diamond–like carbon coatings for raising the wear resistance of precision friction pairs; Tochitsky et al; Surface and Coatings Technology, 47 (1991) 792–796.

Wear resistance of diamond–like carbon coatings; Aksenov et al; Surface and coatings Technology, 47(1991) 252–256..

Wear resistance of diamond–like coatings; Gorpinchenko et al; Surface and coatings Technology, 47 (1991) 201–208.

Ion Beam and Ion–Assisted Deposition of Diamond–Like Carbon Films; Aisenberg et al; Materials Science Forum vol. 52 & 53, pp. 1–40 (1989).

New Applications of CVD Diamond; Spiro et al; GE Corporate Research and Development, pp. 18–39–18–49.

This–Film–Diamond Derby; Craig; Cutting Tool Engineering vol. 44, No. 1 (Feb. 1992).

Microstructural analyses of amorphic diamond, i–c, and amorphous carbon; Collins et al; J. Appl. Phys. 72(1), Jul. 1, 1992.

The Diamond Film Revolution; Norton.

Pure Diamond Available in Large Sizes; Materials Engineering; May 1992.

Norton Diamond Film: Leading a New Technology into Commerical Applications; Norton Company (ca.(1991).

Norton Introduces "White" CVD Diamond Wafers; Norton Company; (ca. 1991).

Amorphic Diamond Coating; Schmidt Instruments, Inc.; Mar. 20, 1992.

Enhanced Performance for Electronic and Optical Products: Diamonex Diamond Coatings brochure (ca. 1991).

Polycrystalline Diamond Heat Spreaders; Diamonex Diamond Coatings brochure; (ca. 1991).

News about Diamond Film and Norton Diamatorr Products; Diamond Directions vol. 1, No. 1 (1991).

New Group of Tools with thick Diamond Film Made by Chemical vapor Deposition; Okuzumi et al; ASAHI Diamond Industrial Company, Limited; pp. 15–1–15–14 (ca. 1991).

* cited by examiner

EARTH-BORING BIT WITH IMPROVED RIGID FACE SEAL

CROSS-REFERENCE

This application is a continuation-in-part of Ser. No. 08/923,009, filed Sep. 3, 1997, now U.S. Pat. No. 6,068,070, and also a continuation-in-part of Ser. No. 08/839,418, filed Apr. 14, 1997, now U.S. Pat. No. 6,045,029, which was a continuation of Ser. No. 08/620,639, filed Mar. 22, 1996, abandoned, which was a continuation-in-part of Ser. No. 08/390,897, filed Feb. 15, 1995, abandoned, which was a continuation of application Ser. No. 08/048,863, filed Apr. 16, 1993, abandoned.

FIELD OF THE INVENTION

The present invention relates generally to earth-boring bits, especially the seal and lubrication systems for earth-boring bits of the rolling cutter variety. More particularly, the present invention relates to improving the wear-resistance and to reducing friction in the seal systems of such earth-boring bits.

BACKGROUND INFORMATION

The success of rotary drilling enabled the discovery of deep oil and gas reservoirs. The rotary rock bit was an important invention that made the success of rotary drilling possible. Only soft earthen formations could be penetrated commercially with the earlier drag bit, but the two-cone rock bit, invented by Howard R. Hughes, U.S. Pat. No. 930,759, drilled the hard cap rock at the Spindletop Field, near Beaumont, Texas with relative ease. That venerable invention, within the first decade of this century, could drill a scant fraction of the depth and speed of the modern rotary rock bit. If the original Hughes bit drilled for hours, the modern bit drills for days. Modern bits sometimes drill for thousands of feet instead of merely a few feet. Many advances have contributed to the impressive improvement of earth-boring bits of the rolling cutter variety.

In drilling boreholes in earthen formations by the rotary method, earth-boring bits typically employ at least one rolling cone cutter, rotatably mounted thereon. The bit is secured to the lower end of a drillstring that is rotated from the surface or by downhole motors. The cutters mounted on the bit roll and slide upon the bottom of the borehole as the drillstring is rotated, thereby engaging and disintegrating the formation material. The rolling cutters are provided with teeth that are forced to penetrate and gouge the bottom of the borehole by weight from the drillstring.

As the cutters roll and slide along the bottom of the borehole, the cutters, and the shafts on which they are rotatably mounted, are subjected to large static loads from the weight on the bit, and large transient or shock loads encountered as the cutters roll and slide along the uneven surface of the bottom of the borehole. Thus, most earth-boring bits are provided with precision-formed journal bearings and bearing surfaces, as well as sealed lubrication systems to increase drilling life of bits. The lubrication systems typically are sealed to avoid lubricant loss and to prevent contamination of the bearings by foreign matter such as abrasive particles encountered in the borehole. A pressure compensator system minimizes pressure differential across the seal so that lubricant pressure is equal to or slightly greater than the hydrostatic pressure in the annular space between the bit and the sidewall of the borehole.

Early Hughes bits had no seals or rudimentary seals with relatively short life, and, if lubricated at all, necessitated large quantities of lubricant and large lubricant reservoirs. Typically, upon exhaustion of the lubricant, journal bearing and bit failure soon followed. An advance in seal technology occurred with the "Belleville" seal, as disclosed in U.S. Pat. No. 3,075,781, to Atkinson et al. The Belleville seal minimized lubricant leakage and permitted smaller lubricant reservoirs to obtain acceptable bit life.

During the quest for improved journal bearing seals, bits employing anti-friction ball or roller bearing elements rose to prominence in bit technology. Roller bearing elements reduce the importance of lubricants and lubrication systems, but introduce a number of other disadvantages. A principal disadvantage is that a failure of any one of the numerous elements likely would permit metallic particles to enter the bearing with almost certain damaging results.

An adequately sealed journal-bearing bit should have greater strength and load-bearing capacity than an anti-friction bearing bit. The seal disclosed by Atkinson would not seal lubricant inside a journal-bearing bit for greater than about 50–60 hours of drilling, on average. This was partially due to rapid movement of the cutter on its bearing shaft (cutter wobble), necessitated by bearing and assembly tolerances, which causes dynamic pressure surges in the lubricant, forcing lubricant past the seal, resulting in premature lubricant loss and bit failure.

The O-ring, journal bearing combination disclosed in U.S. Pat. No. 3,397,928, to Galle unlocked the potential of the journal-bearing bit. Galle's O-ring-sealed, journal-bearing bit could drill one hundred hours or more in the hard, slow drilling of West Texas. The success of Galle's design was in part attributable to the ability of the O-ring design to help minimize the aforementioned dynamic pressure surges.

A major advance in earth-boring bit seal technology occurred with the introduction of a successful rigid face seal. The rigid face seals used in earth-boring bits are improvements upon a seal design known as the "Duo-Cone" seal, developed by Caterpillar Tractor Co. of Peoria, Ill. Rigid face seals are known in several configurations, but typically comprise at least one rigid ring, having a precision seal face ground or lapped thereon, confined in a groove near the base of the shaft on which the cutter is rotated, and an energizer member, which urges the seal face of the rigid ring into sealing engagement with a second seal face. Thus, the seal faces mate and rotate relative to each other to provide a sealing interface between the rolling cutter and the shaft on which it is mounted.

The combination of the energizer member and rigid ring permits the seal assembly to move slightly to minimize pressure fluctuations in the lubricant, and to prevent extrusion of the energizer past the cutter and bearing shaft, which can result in sudden and almost total lubricant loss. U.S. Pat. No. 4,516,641, to Burr; U.S. Pat. No. 4,666,001, to Burr; U.S. Pat. No. 4,753,304, to Kelly; and U.S. Pat. No. 4,923,020 to Kelly, are examples of rigid face seals for use in earth-boring bits. Rigid face seals substantially improve the drilling life of earth-boring bits of the rolling cutter variety. Earth-boring bits with rigid face seals frequently retain lubricant and thus operate efficiently longer than prior-art bits.

Because the seal faces of rigid face seals are in constant contact and slide relative to each other, the dominant mode of failure of the seals is wear. Eventually, the seal faces become pitted and the coefficient of friction between the seal faces increases, leading to increased operating temperatures, reduction in seal efficiency, and eventual seal failure, which ultimately result in bit failure. In an effort to minimize seal wear, seal rings of prior-art rigid face seals are constructed of tool steels such as 440C stainless, or hardenable alloys such as Stellite. Use of these materials in rigid face seals lengthens the drilling life of bits, but leaves room for improvement of the drilling longevity of rigid face seals, and thus earth-boring bits.

A need exists, therefore, for a rigid face seal for use in earth-boring bits having improved wear-resistance and reduced coefficients of sliding friction between the seal faces.

SUMMARY OF THE INVENTION

It is a general object of the present invention to provide an improved rigid face seal for use in an earth-boring bit, the rigid face seal having improved wear-resistance and reduced coefficients of sliding friction between the seal faces thereof.

This and other objects of the present invention are accomplished by providing an earth-boring bit having a bit body, at least one cantilevered bearing shaft, including a cylindrical journal bearing surface extending inwardly and downwardly from the bit body, and at least one cutter mounted for rotation on the cylindrical journal bearing surface of the bearing shaft. A seal assembly is disposed between the cylindrical journal bearing surface and the cutter proximally to the base of the cantilevered bearing shaft. The seal assembly includes at least one rigid seal ring formed of a metal selected from the group consisting of iron and cobalt and alloys thereof, the seal ring having a seal face in contact with a second seal face. At least one of the seal faces is at least partially formed of a super-hard material having wear-resistance greater than, and a coefficient of sliding friction less than, the material of the rigid seal ring, the super-hard material secured to the seal face at a temperature less than the lowest transformation temperature of the metal of the seal ring.

According to the preferred embodiment of the present invention, the second seal face is a radial seal face on a second rigid seal ring and at least the second seal face portion of the second rigid seal ring is at least partially formed of a super-hard material.

According to one embodiment of the present invention, the second seal face is carried by the cutter of the earth-boring bit and the second seal face is formed of a super-hard material.

One preferred super-hard material is amorphic diamond, which has wear-resistance greater than, and a coefficient of sliding friction less than, that of the material of the rigid seal ring.

Another preferred super-hard material is polycrystalline diamond, formed separately from the seal ring and adhered to the seal face of the seal ring by soldering, low-temperature brazing, or adhesive.

In one technique, the diamond layer is grown on a substrate, then separated either chemically or physically from the substrate. The substrate is formed with a surface that is other than smooth and flat. It has a controlled finish and geometry for desired purposes. For example, the surface may have shallow grooves and/or pockets for enhancing lubrication. The surface finish is obtained by forming the inverse of the desired grooves and/or pockets on the substrate. Then, after separation, the desired surface finish will be contained on the diamond layer.

Other objects, features, and advantages of the present invention will be apparent to those skilled in the art with reference to the figures and detailed description, which follow.

DESCRIPTION OF THE PREFERRED EMBODIMENT

Figure 1:
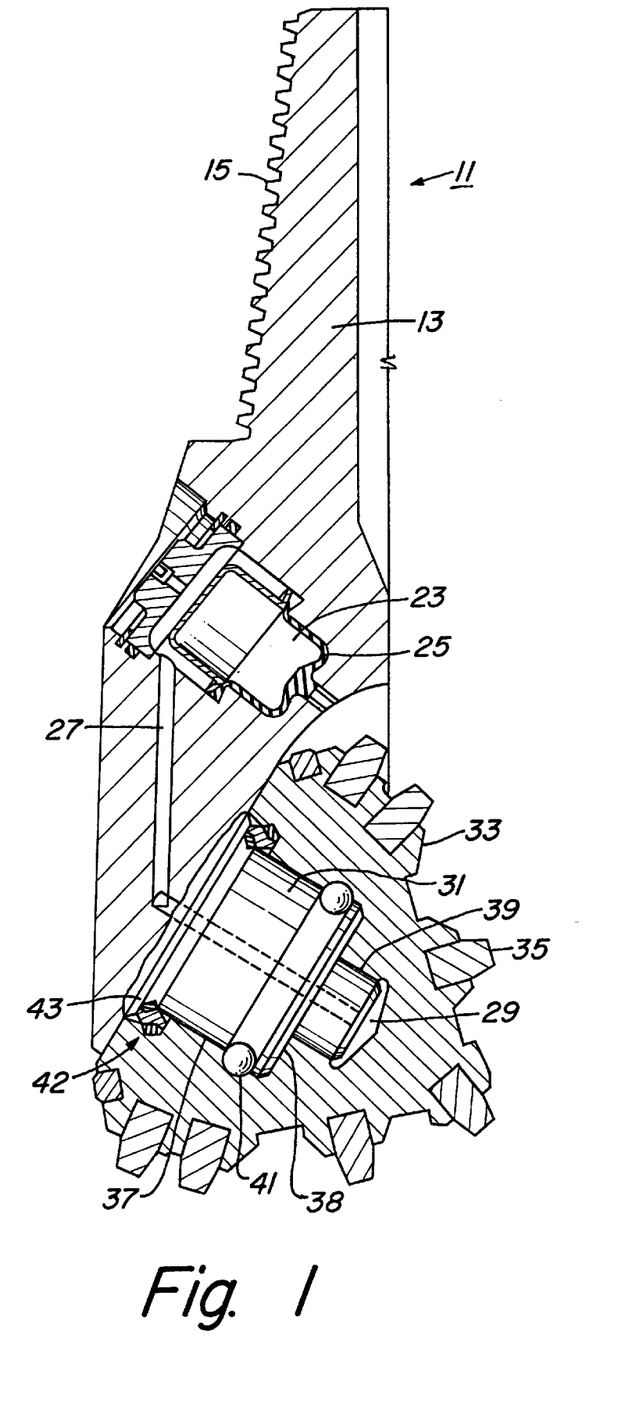
FIG. 1 is a fragmentary section view of a section of an earth-boring bit according to the present invention.

FIG. 1 depicts, in a fragmentary section view, one section of an earth-boring bit 11 according to the present invention. Earth-boring bit 11 is provided with a body 13, which is threaded at its upper extent 15 for connection into a drill-string (not shown).

Earth-boring bit 11 is provided with a pressure compensating lubrication system 23. Pressure compensating lubrication system 23 is vacuum pressure filled with lubricant at assembly. The vacuum pressure lubrication process also ensures that the journal bearing cavity generally designated as 29 is filled with lubricant through passage 27. Ambient borehole pressure acts through diaphragm 25 to cause lubricant pressure to be substantially the same as ambient borehole pressure.

A cantilevered bearing shaft 31 depends inwardly and downwardly from body 13 of earth-boring bit 11. A generally frusto-conical cutter 33 is rotatably mounted on cantilevered bearing shaft 31. Cutter 33 is provided with a plurality of generally circumferential rows of inserts or teeth 35, which engage and disintegrate formation material as earth-boring bit 11 is rotated and cutters 33 roll and slide along the bottom of the borehole.

Cantilevered bearing shaft 31 is provided with a cylindrical bearing surface 37, a thrust bearing surface 38, and a pilot pin bearing surface 39. These surfaces 37, 38, 39 cooperate with mating bearing surfaces on cutter 33 to form a journal bearing on cantilevered bearing shaft 31 on which cutter 33 may rotate freely. Lubricant is supplied to journal bearing through passage 27 by pressure-compensating lubricant system 23. Cutter 33 is retained on bearing shaft 31 by means of a plurality of precision-ground ball locking members 41.

A seal assembly 42 according to the present invention is disposed proximally to a base 43 of cantilevered bearing shaft 31 and generally intermediate cutter 33 and bearing shaft 31. This seal assembly is provided to retain the lubricant within bearing cavity 29, and to prevent contamination of lubricant by foreign matter from the exterior of bit 11. The seal assembly may cooperate with pressure-compensating lubricant system 23 to minimize pressure differentials across seal 42, which can result in rapid extrusion of and loss of the lubricant, as disclosed in U.S. Pat. No. 4,516,641, to Burr. Thus, pressure compensator 23 compensates the lubricant pressure for hydrostatic pressure changes encountered by bit 11, while seal assembly 42 compensates for dynamic pressure changes in the lubricant caused by movement of cutter 33 on shaft 31.

Figure 2:
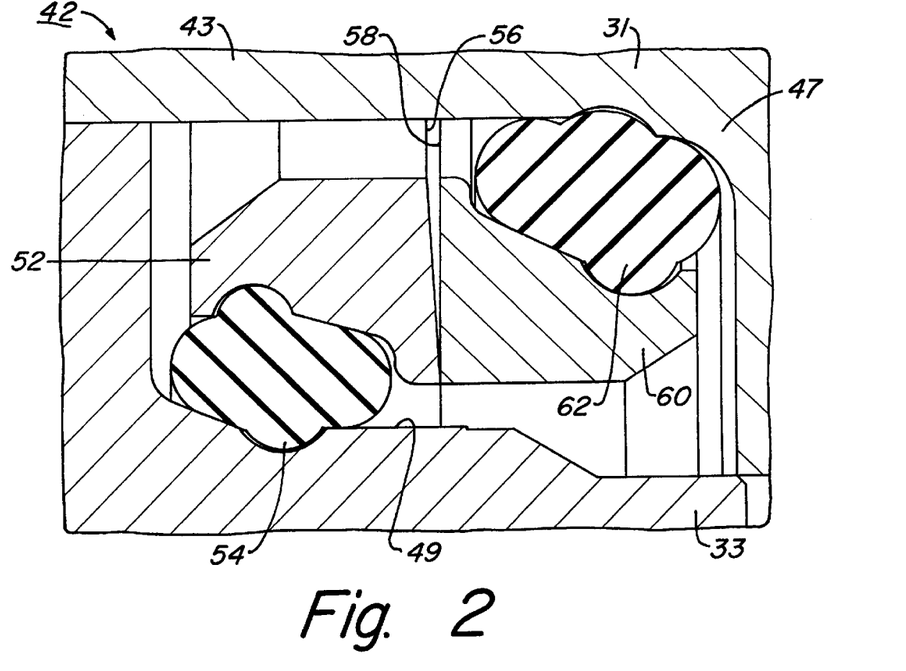
FIG. 2 is an enlarged, fragmentary section view of the preferred seal assembly for use with earth-boring bits according to the present invention.

FIG. 2 depicts, an enlarged section view, a preferred seal configuration 42 contemplated for use with the present invention. Seal assembly 42 illustrated is known as a "dual" rigid face seal because it employs two rigid seal rings, as opposed to the single-ring configuration illustrated in FIG. 3. Dual rigid face seal assembly 42 is disposed proximally to base 43 of bearing shaft 31 and is generally intermediate cutter 33 and shaft 31. Seal assembly 42 is disposed in a seal groove defined by shaft groove 47 and cutter groove 49. Dual rigid face seal assembly 42 comprises a cutter rigid ring 52, a cutter resilient energizer ring 54, shaft rigid ring seal ring 60, and shaft resilient energizer ring 62. Cutter rigid seal ring 52 and shaft rigid seal ring 60 are provided with precision-formed radial seal faces 56, 58, respectively. Resilient energizer rings 54, 62 cooperate with seal grooves 47, 49 and rigid seal rings 52, 60 to urge and maintain radial seal faces 56, 58 in sealing engagement. The seal interface formed by seal faces 56, 58 provides a barrier that prevents lubricant from exiting the journal bearing, and prevents contamination of the lubricant by foreign matter from exterior of bit 11.

According to the preferred embodiment of the present invention, at least a portion of seal faces 56, 58 of rigid seal rings 52, 60 is formed of a super-hard material having a coefficient of sliding friction lower than the material of rigid seal rings 52, 60. Preferably, the entirety of both seal faces 56, 58 is formed of super-hard material. This super-hard material reduces wear on seal faces 56, 58, thereby enhancing the life of seal assembly 42 and reducing friction between seal faces 56, 58, which can degrade seal function. Exemplary dimensions for the seal illustrated in FIG. 2 may be found in U.S. Pat. No. 4,516,641 to Burr.

Figure 3:
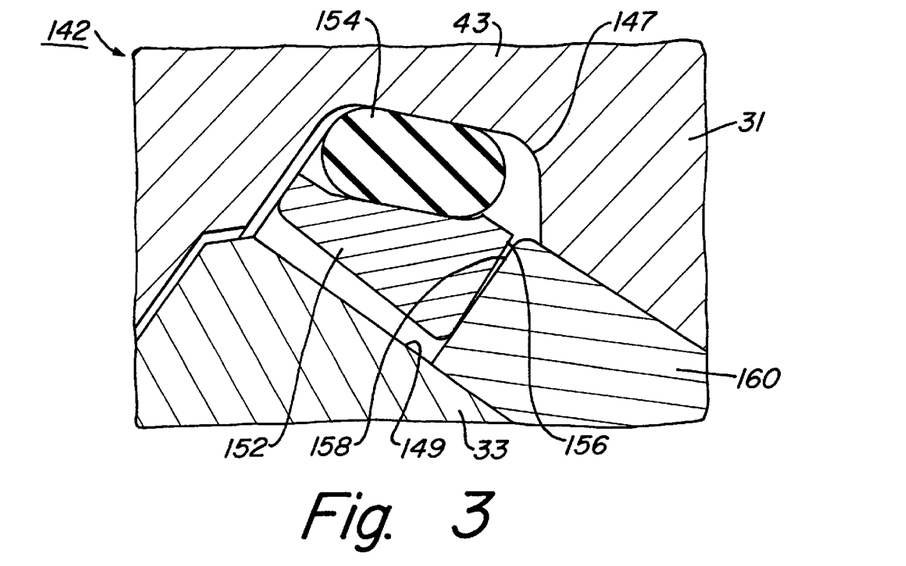
FIG. 3 is an enlarged, fragmentary section view of an alternative seal assembly contemplated for use with the present invention.

FIG. 3 illustrates, in enlarged section view, an alternative seal configuration 142. Seal assembly 142 comprises shaft seal groove 147, cutter seal groove 149, rigid seal ring 152, and resilient energizer ring 154. A precision-formed radial seal face 156 is formed on rigid seal ring 152, and mates with a corresponding precision-formed seal face 158 carried by cutter 33. Seal face 158 is formed on a bearing sleeve 160 interference fit in cutter 33. Resilient energizer ring 154 cooperates with shaft seal groove 147 and rigid seal ring 152 to urge and maintain seal faces 156, 158 in sealing engagement.

At least a portion, and preferably the entirety, of seal faces 156, 158 of seal assembly 142 is formed of super-hard material having a coefficient sliding friction less than that of the material of rigid seal ring 152. Exemplary dimensions for the seal assembly depicted in FIG. 3 may be found in U.S. Pat. No. 4,753,304 to Kelly.

The seal assemblies depicted in FIGS. 1, 2, and 3 are representative of rigid face seal technology and are shown for illustrative purposes only. The utility of the present invention is not limited to the seal assemblies illustrated, but is useful in all manner of rigid face seals.

Super-hard materials (as the term is used herein) are among the hardest known to man and include natural diamond, synthetic diamond, polycrystalline diamond, cubic boron nitride, thick and thin-film diamond, and thin-film diamond-like carbon. These materials have hardnesses in the vicinity of 5000 and upward on the Knoop scale and are to be distinguished from ceramics such as silicon carbide, tungsten carbide, aluminum oxide, and the like, which have hardnesses of less than 3000 on the Knoop scale. In addition to their hardness and resulting wear resistance, super-hard materials, particularly the diamond variants, have generally good-to-excellent properties in sliding friction and heat dissipation, especially acting as a friction pair.

Nevertheless, it has been difficult in the past to form diamond or super-hard coatings or films on metallic substrates, the difficulty arising primarily from a lack of adhesion to the substrate. In addition to the lack of adhesion, most coating or deposition processes involve high temperatures and slow deposition rates. The temperatures involved in conventional vapor deposition processes generally are in the range of 800–1000° C. and upward.

The iron and cobalt-based alloys of which rigid face seal rings are constructed (440C stainless steel and Stellite being examples) have lowest transformation temperatures of approximately 730° C. and 420° C., respectively. Thus, an attempt to coat these seal rings with a super-hard material using conventional high-temperature vapor deposition processes would result in warpage and/or annealing of the rings, an unacceptable result for the precision-formed seal rings.

One particular type of diamond-like carbon has proved to be successful in adhering to metallic substrates. This material is available under the name amorphic diamond from SI Diamond Technology, Inc., of Houston, Tex. This material, and the formation process thereof, is fully described in U.S. Pat. Nos. 4,987,007, Jan. 22, 1991, to Wagal et al., and 5,098,737, Mar. 24, 1992, to Collins et al. The process for formation for amorphic diamond coatings involves extracting ions from a laser ablation plume in a vacuum environment at room temperature and accelerating the ions through a grid for deposit on the substrate. Although the apparatus for formation of amorphic diamond is expensive, it provides for the formation of a coating on a substrate material that occurs at a relatively high and economical rate, and produces a coating that adheres well to the substrate material and possesses generally good and uniform mechanical properties, without detrimental phase transition of the substrate seal ring alloy.

Another preferred method by which a super-hard coating or film can be formed on a metallic substrate such as the seal rings of a rigid face seal is to grow or deposit a polycrystalline diamond film on a substrate, remove the substrate and secure the film to the seal ring using an appropriate adhesive such as epoxy or other high-strength adhesive appropriate to the downhole environment or low-temperature brazing or soldering alloy.

The film is deposited from a carbon-containing vapor or plasma onto a silicon (or similar, inert, high-melting temperature material) substrate having a highly polished surface and a shape conforming to the seal face of the seal ring. The substrate is etched away or otherwise removed, leaving a diamond film conforming to the seal face of the seal ring and having a highly polished surface where the diamond was adjacent the substrate and a rougher side opposite the polished surface.

Other similar processes for obtaining such a free-standing diamond film or sheet are found is U.S. Pat. Nos. 5,254,071 and 5,349,922, to Anthony et al. and assigned to General Electric Co. and U.S. Pat. No. 5,314,652 to Simpson et al. and assigned to Norton Company. In these references, the diamond is deposited upon a molybdenum substrate, and upon cooling, releases from the substrate due to the differential in rates of thermal expansion between the two materials.

Presently, these free-standing diamond films can be obtained in thicknesses between approximately 0.010 and 0.020 inch, with a thickness of 0.015 inch being preferred for the present application as a good balance between strength and cost.

The diamond film then is secured to the seal face of the seal ring using either a high-strength adhesive or by brazing or soldering using an alloy having a melting temperature less than the lowest transformation temperature of the metal alloy of the seal ring. If brazing or soldering is used, a layer of tungsten, nickel, or copper can be deposited on the rough side of the film to enhance metallurgical bonding between the brazing or soldering alloy and the film. Thus, the highly polished surface of the film provides a seal face formed of super-hard material.

Both of these processes yield seal rings having super-hard seal faces with good wear, friction, and heat dissipation characteristics, yet can be formed at temperatures that will not warp, anneal, or otherwise deform the precision-formed seal rings.

Figure 4:
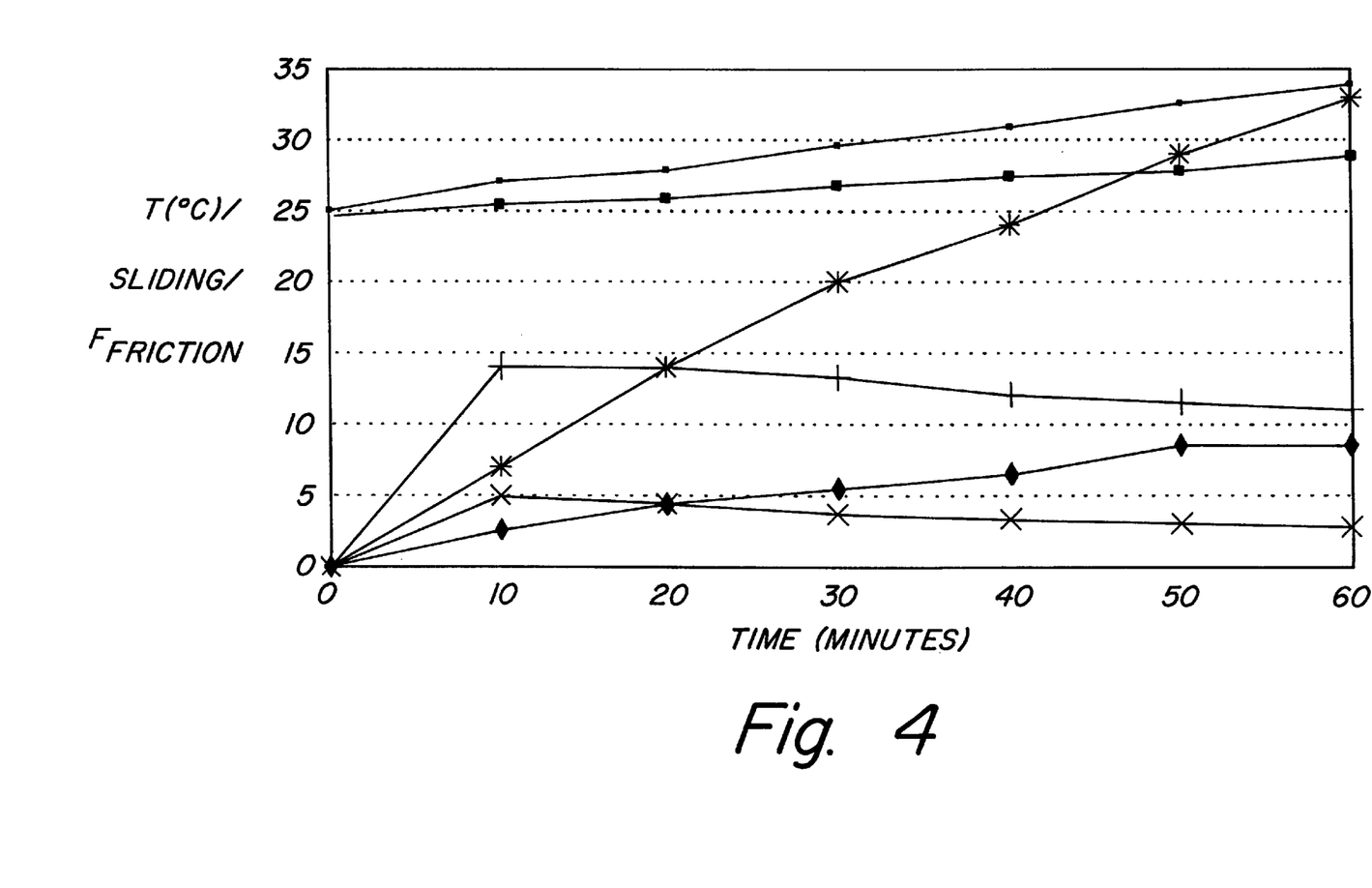
FIG. 4 is a graphical comparison of the results of a test of friction pairs of material coated according to the present invention versus conventional material.

FIG. 4 is a graph comparing operating temperature (T), coefficient of sliding friction ($\mu_{sliding}$), and friction force ($F_{friction}$) for a friction pair of conventional material versus a friction pair coated with super-hard material according to the present invention. The test forming the basis for the graph of FIG. 4 was conducted pursuant to A.S.T.M. D-2714, and comprised rotating both a conventional, uncoated test ring and a test ring having a coating according to the present invention on a test block of the same respective material (see below) at 196 revolutions per minute for 60 minutes, resulting in 11,760 cycles.

The conventional test ring and block were formed of 440C stainless steel hardened to approximately 52 or higher on the Rockwell C scale. The test ring and block according to the present invention were similarly formed, but were provided with a thin-film ($\leq 1$ micron thickness) coating of the amorphic diamond super-hard material.

The test was conducted with 100 milliliters of test lubrication fluid prescribed by the aforementioned A.S.T.M. D-2714 test parameter. The following data was obtained by measuring the aforementioned properties at various time intervals during the test:

| | Prior Art | | |
| --- | --- | --- | --- |
| Time (Min) | Temp (° C.) | Coefficient of Friction | Friction Force (lbf) |
| 0 | 25.0 | 0 | 0 |
| 10 | 27.0 | .140 | 0.7 |
| 20 | 28.0 | .140 | 1.4 |
| 30 | 29.7 | .133 | 2.0 |
| 40 | 31.0 | .120 | 2.4 |
| 50 | 32.6 | .116 | 2.9 |
| 60 | 34.0 | .110 | 3.3 |

| | Present Invention | | |
| --- | --- | --- | --- |
| Time (Min) | Temp ° (C.) | Coefficient of Friction | Friction Force (lbf) |
| 0 | 24.5 | 0 | 0 |
| 10 | 25.5 | .05 | .25 |
| 20 | 26.0 | .045 | .45 |
| 30 | 27.0 | .037 | .55 |
| 40 | 27.6 | .033 | .65 |
| 50 | 28.0 | .030 | .85 |
| 60 | 29.0 | .028 | .85 |

FIG. 4 is a graphical representation of this data for comparison purposes. For this graphical representation, the coefficient of friction values ($\mu_{sliding}$) were multiplied by a factor of 100 and the frictional force values ($F_{friction}$) were multiplied by a factor of 10. Graphed lines 100 and 101 represent the operating temperatures of the conventional friction pair and the friction pair according to the present invention, respectively. Graphed lines 200 and 201 represent the measured frictional force (multiplied by a factor of 10) for the conventional friction pair and the friction pair according to the present invention, respectively. Graphed lines 300 and 301 represent the measured coefficient of sliding friction of the conventional friction pair and the friction pair according to the present invention, respectively. As is demonstrated in FIG. 4, the friction pair according to the present invention operates at a lower temperature, with a lower frictional force, and with a lower coefficient of sliding friction than the conventional friction pair.

In operation, earth-boring bit 11 is attached to a drillstring (not shown) and run into a borehole for drilling operation. The drillstring and earth-boring bit 11 are rotated, permitting cutters 33 to roll and slide along the bottom of the borehole, wherein inserts or teeth 35 engage and disintegrate formation material. While cutters 33 rotate relative to body 13 of earth-boring bit 11, seal assemblies retain lubricant in bearing cavities 29, promoting the free rotatability of cutters 33 on bearing shafts 31.

Resilient energizer rings 54, 62, 154 maintain rigid seal rings 52, 60, 152 and seal faces 56, 58, 156, 158 in sealing engagement. Seal faces 56, 158 associated with cutter 33 rotate relative to seal faces 58, 156 associated with bearing shaft 31, which remain essentially stationary. Thus, seal faces 56, 58, 156, 158 are in constant sliding contact, and are subject to abrasive and frictional wear.

Figure 5:
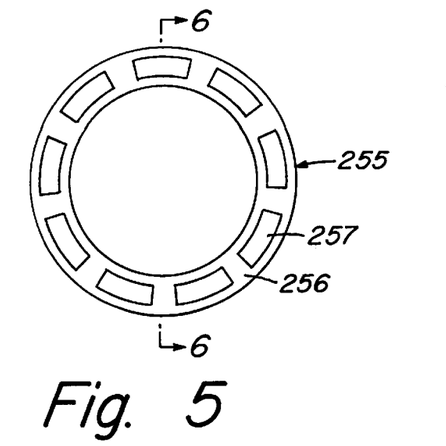
FIG. 5 is a front elevational view of an alternate embodiment of one of the seal rings of FIG. 2 or 3.
Figure 6:
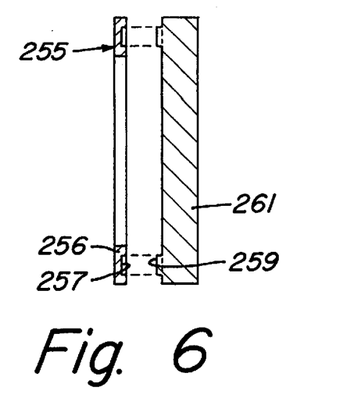
FIG. 6 is an exploded, schematic side view of the diamond layer of the seal ring of FIG. 5 and the substrate on which it was formed.

Referring to FIGS. 5 and 6, layer 255 is formed of a super-hard material as described above, preferably diamond. Rather than being smooth and flat, seal face 256 of super-hard layer 255 has very shallow recesses 257 spaced on it. Recesses 257 may be spaced apart pockets or grooves of a variety of shapes as illustrated in FIGS. 7–12. The shape of recesses 257 shown in Figures and 6 is for illustrative purposes only. Recesses 257 are used to enhance lubrication by retaining some of the lubrication during rotation of cutter 33 (FIG. 1). Because of the thinness of layer 255, recesses 257 are quite shallow.

Recesses 257 may be formed by chemical etching or laser after diamond layer 255 has been formed. Alternately, recesses 257 may be formed while the diamond layer 255 is being made or grown by machining inverse shapes 259 on a manufacturing substrate 261. In the embodiment shown, shapes 259 comprise protruberances that are the inverse of recesses 257. However, if protruberances were desired on diamond face 256, shapes 259 would be recesses. Shapes 259 are formed by conventional machining techniques on substrate 261. Substrate 261 is used only to manufacture diamond layer 255 by a CVD process as described above. Substrate 261 is not used in drill bit 11 (FIG. 1). After layer 255 has been applied by a CVD process, substrate 261 is etched away or otherwise separated from diamond layer 255, leaving diamond layer 255 with a seal face 256 having the desired recesses 257. After super-hard layer 255 is separated from substrate 261, layer 255 is attached to a supporting ring such as ring 52 or 152 as shown in FIGS. 2 and 3.

Substrate 261 may be of silicon or a similar inert high-melting temperature material having a highly polished surface with shapes 259 formed thereon. Alternately, substrate 261 could be of molybdenum, which upon cooling, releases diamond layer 255 from the substrate 261 due to the differential coefficient of thermal expansion between the two materials. In both cases, substrate 261 would be initially machined with the desired shapes 259. In both cases, when diamond layer 255 is separated from substrate 261, seal face 256 will carry the desired surface configuration with lubrication recesses, grooves or pockets 257.

Figure 7:
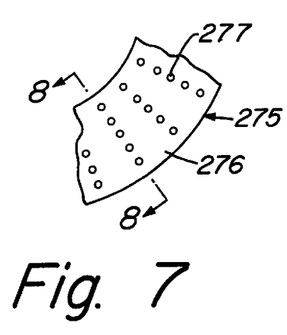
FIG. 7 is a partial front view of another alternate embodiment of one of the seal rings of FIG. 2 or 3.
Figure 8:
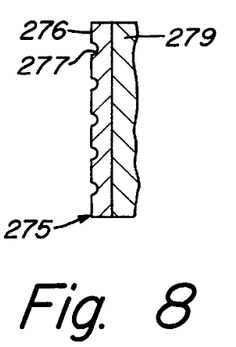
FIG. 8 is a sectional view of the seal ring of FIG. 7, taken along the line 8—8 of FIG. 7.

FIGS. 7 and 8 illustrate another embodiment of a seal ring having a diamond layer 275. Diamond layer 275 has a face 276 plurality of shallow, blind circular holes 277, which may be uniformly or randomly spaced. Diamond layer 275 is attached to a rigid supporting ring 279 which is similar to ring 52 or 152 (FIGS. 2 and 3) as previously described. Holes 277 may be formed in the same manner as pockets 257 described above and are employed to enhance lubrication.

Figure 9:
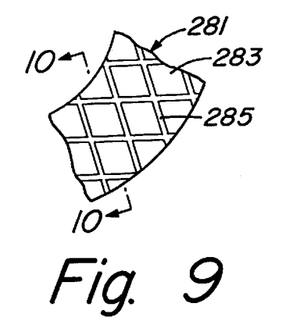
FIG. 9 is a partial front view of another alternate embodiment of one of the seal rings of FIG. 2 or 3.

FIGS. 8 and 9 illustrate another embodiment of a seal ring having a diamond layer 281. The face 283 of diamond layer 281 has a cross-hatching of shallow grooves 283 for enhancing lubrication. As shown in FIG. 9, grooves 285 may be semi-circular in cross-section. Alternately, they may be V-shaped or rectangular. Diamond layer 283 is attached to a rigid supporting ring 287. Grooves 283 may be formed as described above in connection with pockets 257.

Figure 10:
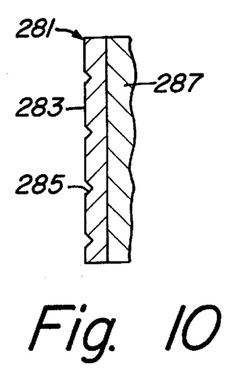
FIG. 10 is a sectional view of the seal ring of FIG. 9, taken along the line 10—10 of FIG. 9.
Figure 11:
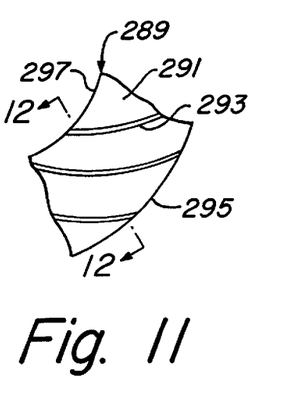
FIG. 11 is a partial front view of another alternate embodiment of one of the seal rings of FIG. 2 or 3.
Figure 12:
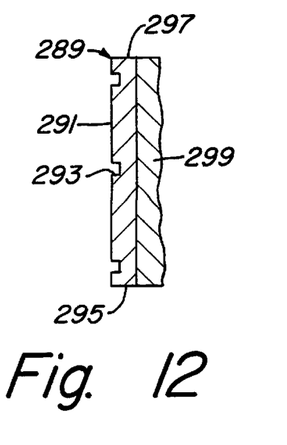
FIG. 12 is a sectional view of the seal ring of FIG. 11, taken along the line 12—12 of FIG. 11.

FIGS. 10 and 11 illustrate still another embodiment of a seal ring having a diamond layer 291. Face 293 contains a plurality of grooves 293 which are parallel and helical. Each groove 293 may extend from an outer diameter 295 to an inner diameter 297 to direct lubricant radially inward. Each groove 293 may be rectangular in cross-section as shown in FIG. 11, or may be other shapes, such as semi-circular or V-shaped.

Grooves 293 are attached to a supporting ring 299 and formed as described above.

Rigid face seals having seal faces formed according to the present invention provide increased wear-resistance, lower coefficients of sliding friction there between, and a lower operating temperature over prior-art rigid face seals. These factors combined provide a seal assembly, and thus an earth-boring bit, having longer operational life. The ability of the seal assembly to withstand wear and operate longer than prior-art seals permits retention of lubricant in the bearing surfaces for longer periods of time, thus resulting in an earth-boring bit having increased life and therefore more economical operation.

The present invention has been described with reference to several embodiments thereof. Those skilled in the art will appreciate that the invention is thus not limited, but is susceptible to variation and modification without departure from the scope and spirit thereof.

What is claimed is:

1. A method for constructing an earth-boring bit, comprising:
   (a) providing a bit body with at least one cantilevered bearing shaft that has a base and extends inwardly and downwardly from the bit body;
   (b) forming at least one rigid seal ring;
   (c) forming a contour on a substantially flat face of a substrate;
   (d) forming on the face and contour of the substrate a free-standing layer of a super-hard material which has a hardness of upwards of 5000 on the Knoop scale;
   (e) separating the super-hard layer and the substrate from each other, thereby forming a face on the super-hard layer that has a contour inverse to the contour formed on the substrate;
   (f) attaching the super-hard layer to the rigid ring;
   (g) positioning the seal face of the rigid seal ring in contact with a second seal face to define a seal assembly;
   (h) mounting the seal assembly on the bearing shaft proximal to the base of the bearing shaft; and
   (i) mounting a cutter on the bearing shaft for rotation and in engagement with the seal assembly.

2. The method according to claim 1, where step (f) comprises attaching the super-hard layer to the rigid seal ring by an adhesive.

3. The method according to claim 9, wherein step (f) comprises brazing the super-hard layer to the rigid seal ring.

4. The method according to claim 9, wherein step (g) comprises at least partially forming the second face with a super-hard material having a hardness of upward of 5000 on the Knoop scale.

5. The method of claim 1, wherein the contour on the super-hard layer comprises at least one recess for enhancing lubrication.

6. The method of claim 1 wherein step (b) comprises forming the rigid ring of a hardened metal selected from the group consisting of iron, cobalt and alloys thereof.

7. The method of claim 1, wherein step (f) comprises securing the super-hard material to the rigid seal ring while not exceeding a lowest transformation temperature of the metal of the rigid seal ring.

8. The method of claim 1, wherein step (d) comprises a chemical vapor deposition process.

9. A method for constructing an earth-boring bit, comprising:
   (a) providing a bit body with at least one cantilevered bearing shaft that has a base and extends inwardly and downwardly from the bit body;
   (b) providing a seal assembly by forming at least one rigid seal ring;
   (c) forming on a substrate a substantially flat face having at least one protruding shape which is an inverse of a desired recess on a seal face of the seal assembly;
   (d) forming by chemical vapor deposition on the face and shape of the substrate a free-standing layer of a super-hard material which has a hardness of upwards of 5000 on the Knoop scale;
   (e) separating the super-hard layer and the substrate from each other, thereby forming a face on the super-hard layer that is substantially flat and contains the recess that is the inverse of the shape;
   (f) attaching the super-hard layer to the rigid ring;
   (g) positioning the seal face of the rigid seal ring in contact with a second seal face to define a seal assembly;
   (h) mounting the seal assembly on the bearing shaft proximal to the base of the bearing shaft; and
   (i) mounting a cutter on the bearing shaft for rotation and in engagement with the seal assembly.

10. The method according to claim 9, where step (f) comprises attaching the super-hard layer to the rigid seal ring by an adhesive.

11. The method according to claim 9, wherein step (f) comprises brazing the super-hard layer to the rigid seal ring.

12. The method according to claim 9, wherein step (g) comprises at least partially forming the second face with a super-hard material having a hardness of upward of 5000 on the Knoop scale.

* * * * *